(No Model.)
C. L. COFFIN.
METHOD OF AND APPARATUS FOR ELECTRICALLY WELDING SHEET METAL.
No. 499,657.  Patented June 13, 1893.
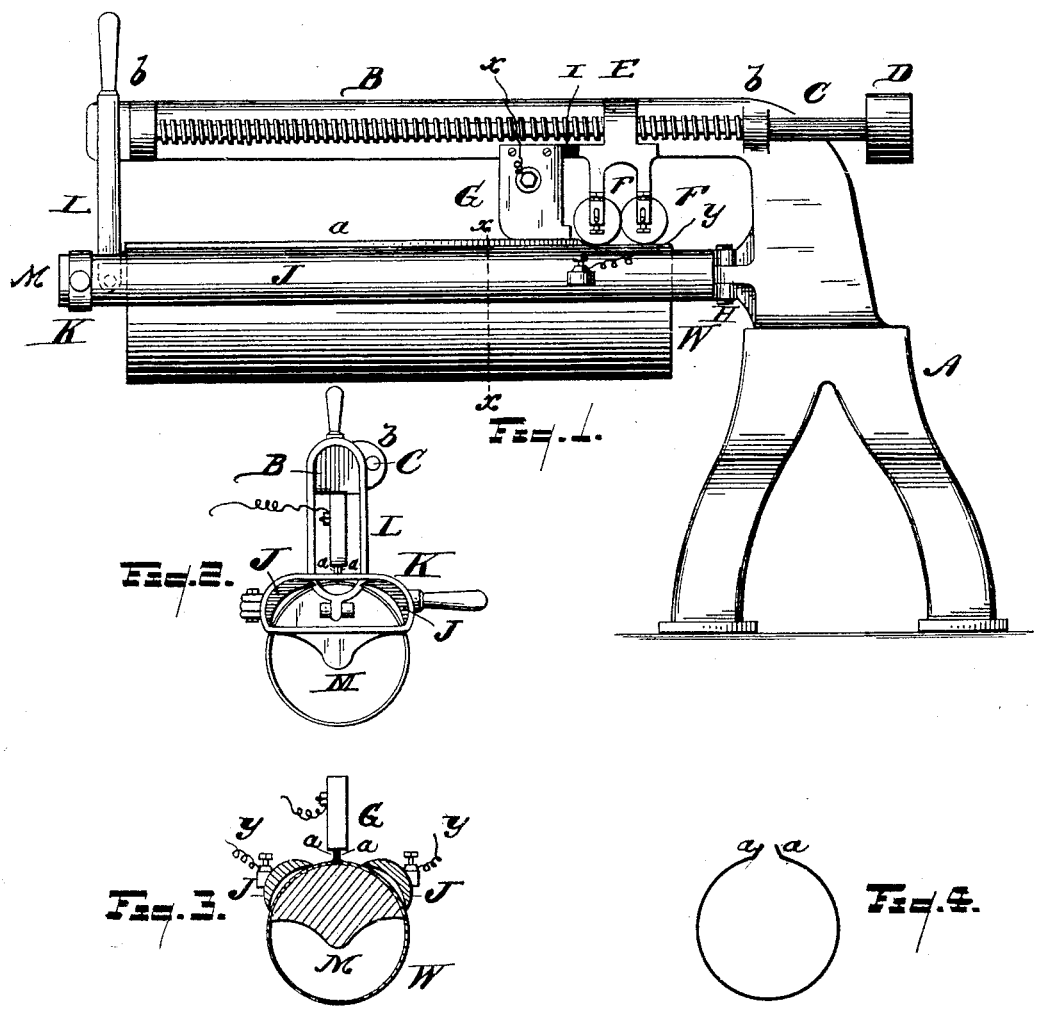
WITNESSES
Gertrude H. Anderson
Geo H Lothrop
INVENTOR
Charles L. Coffin

UNITED STATES PATENT OFFICE.

CHARLES L. COFFIN, OF DETROIT, MICHIGAN.

METHOD OF AND APPARATUS FOR ELECTRICALLY WELDING SHEET METAL.

SPECIFICATION forming part of Letters Patent No. 499,657, dated June 13, 1893.

Application filed October 18, 1892. Serial No. 449,273. (No model.)

*To all whom it may concern:*

Be it known that I, CHARLES L. COFFIN, of Detroit, in the county of Wayne and State of Michigan, have invented a new and useful Improvement in Methods of and Apparatus for Electrically Welding Sheet Metal, of which the following is a specification.

My invention consists in a method of and apparatus for electrically welding sheet metal, hereinafter fully described and claimed.

Figure 1 is a side elevation. Fig. 2 is an end elevation looking from the left Fig. 1, omitting the frame. Fig. 3 is a section on line x—x Fig. 1; and Fig. 4 is an end view of a tube prepared for welding.

In preparing a tube for welding I turn up flanges a a at the points to be welded, and thus obtain sufficient metal to make the joint and also obtain imperfect contact on both faces with a single electrode.

A represents the base of the machine, on the upper part of which is carried a horizontal arm B, somewhat longer than the joint or seam to be welded. Below the arm B and parallel therewith a mandrel M is carried on frame A, to the other end of which mandrel is pivoted one end of a link L adapted when turned up in the position shown in Fig. 1, to hook over the end of arm B, and thereby support said mandrel at its outer end.

J J represent two conductors, each of which is hinged at one end to a lug H carried on the frame A below arm B, and each of said conductors J is insulated from the frame A and also from the mandrel M. The two conductors Y Y connect the conductors J J with one terminal of a source of electric energy.

K represents a link pivoted at one end to one of the conductors J and adapted to inclose the other conductor when they are brought in the position shown in Fig. 2, and thus hold said conductors firmly pressed against the tube W when in position to be welded.

C represents a threaded shaft journaled in lugs b b formed on arm B, and provided with any convenient means for rotating the same, as for example a pulley D.

E represents a carriage or nut threaded and traveling on screw shaft C when the same is rotated. The carriage E carries a conductor G which is insulated from said carriage, as shown at I, and which is adapted to rest upon the upturned flanges a a of a tube W, carried on mandrel M. The carriage E also carries one or two rollers F F in the rear of the conductor G, which rollers are adapted to press on the upturned flanges a a when carriage E is made to traverse screw shaft C. Any suitable means for forcing rollers F F toward the work may be used, and as this may be done by a screw or by a spring, or by a weighted lever, or in many other ways, I have not shown any particular device for this purpose.

The conductor G is connected by conductor X to the other terminal of the same source of electric energy to which conductors J J are connected.

The operation of my invention is as follows: A sheet of metal which is to be welded is first bent into the form of a tube W and its edges slightly upturned, as shown at a a, Fig. 4. The carriage E being retracted to its nearest position with reference to frame A, and the links K and L being thrown out of engagement, the conductors J J are swung on their hinges away from the mandrel M, and the tube W is slipped over mandrel M with its edges a a directly in line with conductor G and rollers F F. The link L is now thrown in the position shown in Figs. 1 and 2, to support the mandrel (though this link may be entirely dispensed with if the parts are made strong enough for that purpose) and the conductors J J swung toward each other and locked by the link K, thus clamping the tube blank W between said conductors and the mandrel M. The carriage E is now moved forward until the conductor G comes in contact with the upturned edges a a, when a heating current is passed through the conductors X and G, passing through the edges a a, rapidly bringing them to a welding point, through the material of tube W to the conductors J, and then back through the conductors Y, or vice versa. As the edges a a are brought to a welding heat, the carriage E is advanced by rotating screw shaft C, bringing the conductor G in contact with another portion of the flanges a a and the rollers F F, pressing the heated portions of a a down upon the mandrel as shown in Fig. 1, thus welding them together, and the operation thus proceeds until the flanges a a are welded along their entire length, when the current is shut off, the carriage E retracted, the welded tube W removed and another one put in position for welding.

The lower surface of conductor G may be made of various lengths for different thicknesses of sheet metal so as to concentrate the heating effect of the current upon such an extent of the metal to be heated as will permit the welding operation to be continuous from one end of the pipe to the other. It will also be noticed that the current is passed through the welding edges of the pipe approximately in a direction or plane of their inclination, by which means the edges or flanges are rapidly raised to a welding temperature.

While I have illustrated and described my invention as applied to welding a sheet metal tube, it is evident that it is equally applicable to welding two sheets of metal, as the clamping conductors J and mandrel M may be of any form desired. It is also evident that instead of forming flanges $a$ $a$ on both edges to be welded, a flange may be formed only on one edge, in which case the lower surface of conductor G may be made of such shape as to make contact both with the flanged and unflanged edge simultaneously.

What I claim as my invention, and desire to secure by Letters Patent, is—

1. The herein described method of electrically heating or welding consisting in first flanging one or both edges of the metal along the proposed seam or joint, clamping the two sheets to be welded between clamps connected with one terminal of a source of electric energy, bringing the edges into contact with a conductor connected with the other terminal of said source of electric energy, passing a heating current through said conductors and the material until the edges are raised to a welding temperature and then completing the welding by rolling, pressing or hammering.

2. The herein described method of electrically heating or welding a pipe, or tube, or ring, or continuous piece of metal, consisting in first flanging one or both edges of the metal along the proposed seam or joint, clamping the two edges of the seam or joint between a clamp and a mandrel connected to one terminal of a source of electric energy, bringing the edges into contact with a conductor connected with the other terminal of said source of electric energy, passing a heating current through said conductor and the material until the edges are raised to a welding or working temperature, then completing the welding or working by rolling, pressing or hammering.

3. In a machine for electrically welding metal the combination with a base of an arm carried thereon, a mandrel supported on said base parallel with said arm, conductors hinged to the base and adapted to clamp the material to be welded against said mandrel and connected with one terminal of a source of electric energy, a traversing carriage on said arm, an insulated conductor carried on said carriage connected with the other terminal of a source of electric energy, and a pressure roller carried on said carriage, substantially as and for the purposes set forth.

4. In a machine for electrically heating or welding pipes, tubes, rings, tires or continuous metal articles, the combination with a support, of an arm carried thereon, a mandrel parallel with said arm, a conductor adapted to clamp the material to be welded against said mandrel and connected with one terminal of a source of electric energy, an insulated traversing conductor carried on said arm and connected with the other terminal of the source of electric energy, a traversing carriage carried on said arm, and a pressure roller carried on said carriage.

CHARLES L. COFFIN.

Witnesses:
GERTRUDE H. ANDERSON,
GEO. H. LOTHROP.